(12) United States Patent
Staats (10) Patent No.: US 8,762,446 B1
(45) Date of Patent: Jun. 24, 2014

(54) BRIDGED DISTRIBUTED DEVICE CONTROL OVER MULTIPLE TRANSPORTS METHOD AND APPARATUS

(75) Inventor: Erik P. Staats, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 09/432,997

(22) Filed: Nov. 2, 1999

(51) Int. Cl.
G06F 15/16 (2006.01)

(52) U.S. Cl.
USPC ........... 709/203; 709/200; 709/202; 709/224; 709/227; 709/228; 709/232; 709/250; 370/235; 719/310

(58) Field of Classification Search
USPC ......... 709/232, 315, 217, 219, 227–228, 226, 709/236, 249, 202, 200, 203, 224, 250, 220, 709/231, 246, 321, 327, 301; 370/401, 235, 370/465; 707/9, 203; 713/201; 718/107; 719/310
See application file for complete search history.

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhan | 370/16 |
| 5,274,631 A | 12/1993 | Bhardwaj | 370/60 |
| 5,343,461 A | 8/1994 | Barton et al. | 370/13 |
| 5,394,556 A | 2/1995 | Oprescu | 395/800 |
| 5,452,330 A | 9/1995 | Goldstein | 375/257 |
| 5,490,253 A | 2/1996 | Laha et al. | 395/304 |
| 5,495,481 A | 2/1996 | Duckwall | 370/85.2 |
| 5,539,390 A | 7/1996 | Nagano et al. | 340/825.07 |
| 5,541,670 A | 7/1996 | Hanai | 348/705 |
| 5,568,641 A | 10/1996 | Nelson | 395/700 |
| 5,583,922 A | 12/1996 | Davis et al. | 379/96 |
| 5,621,659 A | 4/1997 | Matsumoto et al. | 364/514 R |
| 5,630,173 A | 5/1997 | Oprescu | 395/860 |
| 5,640,595 A | 6/1997 | Baugher et al. | 395/830 |
| 5,684,715 A | 11/1997 | Palmer | 365/514 |
| 5,701,476 A | 12/1997 | Fenger | 395/652 |
| 5,701,492 A | 12/1997 | Wadsworth et al. | 395/712 |
| 5,712,834 A | 1/1998 | Nagano et al. | 369/19 |
| 5,719,862 A * | 2/1998 | Lee et al. | 370/355 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/408 |
| 5,805,073 A | 9/1998 | Nagano et al. | 340/825.07 |
| 5,809,331 A | 9/1998 | Staats et al. | 395/830 |
| 5,832,298 A | 11/1998 | Sanchez et al. | 395/828 |
| 5,835,761 A | 11/1998 | Ishii et al. | 395/653 |
| 5,867,730 A | 2/1999 | Leyda | 395/830 |
| 5,875,301 A | 2/1999 | Duckwall et al. | 395/200.51 |
| 5,892,903 A * | 4/1999 | Klaus | 726/25 |
| 5,938,764 A | 8/1999 | Klein | 713/1 |
| 5,963,556 A * | 10/1999 | Varghese et al. | 370/401 |
| 5,968,152 A | 10/1999 | Staats | 710/104 |
| 5,970,052 A | 10/1999 | Lo et al. | 370/241 |
| 5,974,049 A * | 10/1999 | Ratcliff et al. | 370/401 |
| 5,987,515 A * | 11/1999 | Ratcliff et al. | 709/224 |
| 5,987,605 A | 11/1999 | Hill et al. | 713/2 |
| 6,014,699 A * | 1/2000 | Ratcliff et al. | 709/224 |

(Continued)

*Primary Examiner* — Thu Ha Nguyen
(74) *Attorney, Agent, or Firm* — Gazdzinski & Associates, PC (57) ABSTRACT

Disclosed herein is a bridged distributed driver messaging system. This system is especially applicable in IEEE 1394 architectures and AV/C devices, but not limited to such applications. The distributed driver message system includes a means for mapping transports to device IDs without regard to protocols. The bridge aspect disclosed also allows for disparate cabling media to be utilized in a multinode system without regard to protocols, but only with regard to transports.

18 Claims, 6 Drawing Sheets

(56) References Cited

U.S. PATENT DOCUMENTS

| | | | | |
|---|---|---|---|---|
| 6,023,734 A * | 2/2000 | Ratcliff et al. | | 719/310 |
| 6,032,202 A | 2/2000 | Lea et al. | | 710/8 |
| 6,038,625 A | 3/2000 | Ogino et al. | | 710/104 |
| 6,047,325 A * | 4/2000 | Jain et al. | | 709/227 |
| 6,070,187 A * | 5/2000 | Subramaniam et al. | | 709/220 |
| 6,073,206 A | 6/2000 | Piwonka et al. | | 711/102 |
| 6,078,964 A * | 6/2000 | Ratcliff et al. | | 719/310 |
| 6,122,248 A | 9/2000 | Murakoshi et al. | | 370/216 |
| 6,131,129 A | 10/2000 | Ludtke | | 710/5 |
| 6,131,163 A * | 10/2000 | Wiegel | | 713/201 |
| 6,133,938 A | 10/2000 | James | | 348/8 |
| 6,138,196 A | 10/2000 | Takayama et al. | | 710/105 |
| 6,141,702 A | 10/2000 | Ludtke et al. | | 710/5 |
| 6,141,767 A | 10/2000 | Hu et al. | | 714/1 |
| 6,157,972 A | 12/2000 | Newman et al. | | 710/100 |
| 6,160,796 A | 12/2000 | Zou | | 370/257 |
| 6,167,532 A | 12/2000 | Wisecup | | 713/300 |
| 6,173,327 B1 * | 1/2001 | De Borst et al. | | 707/203 |
| 6,192,189 B1 | 2/2001 | Fujinami et al. | | 386/96 |
| 6,202,210 B1 | 3/2001 | Ludtke | | 725/20 |
| 6,216,173 B1 * | 4/2001 | Jones et al. | | 715/705 |
| 6,233,615 B1 | 5/2001 | Van Loo | | 709/224 |
| 6,233,624 B1 * | 5/2001 | Hyder et al. | | 709/327 |
| 6,247,083 B1 | 6/2001 | Hake et al. | | 710/107 |
| 6,253,114 B1 | 6/2001 | Takihara | | 700/83 |
| 6,253,255 B1 * | 6/2001 | Hyder et al. | | 709/231 |
| 6,260,063 B1 | 7/2001 | Ludtke et al. | | 709/224 |
| 6,266,334 B1 | 7/2001 | Duckwall | | 370/397 |
| 6,266,701 B1 * | 7/2001 | Sridhar et al. | | 709/232 |
| 6,282,597 B1 | 8/2001 | Kawamura | | 710/105 |
| 6,295,479 B1 | 9/2001 | Shima et al. | | 700/83 |
| 6,308,222 B1 * | 10/2001 | Krueger et al. | | 370/235 |
| 6,311,228 B1 * | 10/2001 | Ray | | 709/321 |
| 6,314,448 B1 * | 11/2001 | Conner et al. | | 709/202 |
| 6,331,984 B1 * | 12/2001 | Luciani | | 370/401 |
| 6,345,315 B1 * | 2/2002 | Mishra | | 719/329 |
| 6,353,868 B1 | 3/2002 | Takayama et al. | | 710/129 |
| 6,385,679 B1 | 5/2002 | Duckwall et al. | | 710/119 |
| 6,470,389 B1 * | 10/2002 | Chung et al. | | 709/227 |
| 6,516,316 B1 * | 2/2003 | Ramasubramani et al. | | 707/9 |
| 6,529,477 B1 * | 3/2003 | Toporek et al. | | 370/235 |
| 6,560,236 B1 * | 5/2003 | Varghese et al. | | 370/401 |
| 6,640,302 B1 * | 10/2003 | Subramaniam et al. | | 713/169 |
| 6,704,317 B1 * | 3/2004 | Dobson | | 370/401 |
| 6,711,162 B1 * | 3/2004 | Ortega et al. | | 370/389 |
| 6,747,979 B1 * | 6/2004 | Banks et al. | | 370/401 |
| 6,779,035 B1 * | 8/2004 | Gbadegesin | | 709/228 |
| 6,813,768 B1 * | 11/2004 | Cragun | | 718/107 |
| 6,853,637 B1 * | 2/2005 | Norrell et al. | | 370/352 |
| 6,857,009 B1 * | 2/2005 | Ferreria et al. | | 709/219 |
| 6,910,074 B1 * | 6/2005 | Amin et al. | | 709/227 |
| 6,934,756 B2 * | 8/2005 | Maes | | 709/227 |
| 7,003,571 B1 * | 2/2006 | Zombek et al. | | 709/227 |
| 7,028,051 B1 * | 4/2006 | McMullan et al. | | 707/104.1 |
| 7,275,175 B2 * | 9/2007 | Cardona et al. | | 714/4.11 |
| 7,483,374 B2 * | 1/2009 | Nilakantan et al. | | 370/235 |
| 7,516,174 B1 * | 4/2009 | Tashjian et al. | | 709/200 |
| 7,987,228 B2 * | 7/2011 | McKeown et al. | | 709/202 |
| 8,015,271 B2 * | 9/2011 | McKeown et al. | | 709/223 |
| 2002/0032803 A1 * | 3/2002 | Marcos et al. | | 709/315 |
| 2002/0087710 A1 * | 7/2002 | Aiken et al. | | 709/232 |
| 2002/0174262 A1 * | 11/2002 | Marcos et al. | | 709/315 |
| 2003/0182431 A1 * | 9/2003 | Sturniolo et al. | | 709/227 |
| 2003/0204603 A1 * | 10/2003 | Buchanan et al. | | 709/228 |
| 2005/0240943 A1 * | 10/2005 | Smith et al. | | 719/328 |
| 2005/0246716 A1 * | 11/2005 | Smith et al. | | 719/315 |
| 2006/0010253 A1 * | 1/2006 | Aiken et al. | | 709/250 |
| 2010/0070570 A1 * | 3/2010 | Lepeska | | 709/203 |
| 2013/0097664 A1 * | 4/2013 | Herz et al. | | 726/1 |

* cited by examiner

BRIDGED DISTRIBUTED DEVICE CONTROL OVER MULTIPLE TRANSPORTS METHOD AND APPARATUS

BACKGROUND OF THE INVENTION

1. Field of the Invention

This invention relates to distributed communication techniques. More particularly, this invention relates to techniques for implementing a distributed driver architecture over multiple transports. Application of this invention may especially be found in the realm of higher level protocols for IEEE 1394 systems. Further, this invention relates to bridging devices and method implementations in a distributed driver messaging system.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbits/second. Most consumer electronic devices available on the market have supported either 100 or 100/200 Mbits/second; meaning that plenty of headroom remains in the 1394 specification. However, as more devices are added to a system, and improvements in the quality of the A/V data (i.e., more pixels and more bits per pixel) emerge, a need for greater bandwidth has been indicated.

The 1394a specification (pending approval) offers efficiency improvements, including support for very low power, arbitration acceleration, fast reset and suspend/resume features. However, not all devices meet the 1394 specification and not all devices communicate by way of the same protocols.

The old methods for implementing distributed driver architectures provide a monolithic messaging service that is hard-wired to a particular type of transport. Prior art distributed driver architectures (for example, Home Audio/Video interoperability (HAVi), and Universal Plug and Play (UPnP)) rely on a single type of transport for sending messages between distributed nodes (Function Control Protocol (FCP) in the case of HAVi, and Transmission Control Protocol/Internet Protocol (TCP/IP) in the case of UPnP). The design of these architectures is limited since they do not include provisions for multiple transport plug-ins. That is, support of multiple transports simultaneously by these architectures is not supported, even if they support 1394. Furthermore, they are proprietary in that they may only communicate with devices that can communicate with the same protocol and/or include identical connectivity media. Put another way, these technologies do not provide a means of bridging the driver control across multiple transports. Thus, an application running on a node supporting an IP transport cannot control a device residing on a node supporting FCP, even if an intermediate node supports both transports. The old method of distributing device driver control assumes a homogenous, single transport network. While old methods may support distributed control over more than one type of transport, they do not support distributed control where the controlling node resides on one transport type and the node under control resides on a second transport type.

It is therefore desirable to overcome this shortcoming by providing a means for devices to communicate with one another without regard to protocols or connectivity. This is especially true today, when users of such devices have an ever-growing desire to couple all types of audio/video equipment to their personal computers for instance. However, at present there is no convenient means for enabling multiple such devices to communicate one with the others. That is, a user may be able to connect a video camera to a computer if they have the appropriate cables and protocols. However, if that user wishes to connect an A/V system to a computer and a video camera, matters are far more difficult, if not impossible in many instances. This situation is further exasperated when available devices cannot communicate with each other due to port/media interface incompatibility.

BRIEF DESCRIPTION OF THE INVENTION

This invention provides a bridged modular messaging service for a distributed driver architecture. This messaging service is divided into a high level, transport independent message protocol layer and low level transport plug-ins. The protocol layer tracks the available transport types and the transport instances for each. Thus, the messaging system can not only support more than one type of transport simultaneously, but also more than one instance of a transport. For example, the messaging system can support message transport over IP and message transport over two FCP transports operating on two 1394 busses.

This invention separates the distributed driver messaging system into the message protocol layer, the message transport layer, and the distributed driver layer. The message protocol layer is independent of the type of transport used to transmit and receive messages. The message transport layer consists of one or more transport plug-ins and one or more instances of each. The message protocol layer maintains a list of each available transport plug-in and each available transport instance. The distributed driver layer exchanges messages between distributed nodes by associating a target driver ID with a message and providing the message and its target driver ID to the message protocol layer. The message protocol layer maps a message's driver ID to the appropriate message transport instance and passes the message to that transport instance for delivery.

The message protocol layer also provides notification services such that new transports may be added at run time. When a message transport plug-in detects a new instance of a transport (e.g., an FCP transport plug-in detects a new 1394 bus hot plugged into a PC Card slot), it notifies the message protocol layer of the new transport. The message protocol layer adds the new transport instance to its list of instances and notifies the distributed driver layer. The distributed driver layer then exchanges messages through the new transport to enumerate the available devices and drivers on other distributed nodes accessed through the new transport.

This disclosed system includes the distributed driver architecture described above and supports the transport of driver control messages over multiple protocols simultaneously. This support is implemented by an intermediate bridge node which forwards driver control messages from one transport to other transports or vice versa.

In this invention, viewed from one vantage point, the bridge node bridges a controller node to a node under control. The bridge node itself may act as a controller node. In this capacity, it creates a virtual device which acts as the controlling driver for the physical device on the node under control. The virtual device on the bridge node is presented as a controllable device to the distributed driver system on both transports. Thus, another node may control the virtual device which in turn controls the physical device on the node under control. In that case, the controller node on the first transport may control the virtual device on the bridge node using the first transport to transport driver control messages. The virtual device receives the driver control messages through the first transport and forwards them through the second transport to the physical device on the node under control.

Therefore it is a primary object of the present invention to provide a bridging device and method for transporting multiple transports to one or more distributed devices.

It is another object of the present invention to distribute messages to devices without regard to specified device protocols.

It is another object of the present invention to provide a method for identifying device transports upon detection of the device in a system.

It is another object of the present invention to provide a method for sending a message from one device to a targeted device by means of an inventive distributed driver messaging system.

Viewed from another vantage point a bridged message transport system is disclosed, comprising in combination, at least one client node; at least one server node; a bridge node, operatively coupling said at least one client node to said at least one server node via said bridge node; and a distributed driver messaging system included throughout said nodes for transporting messages from one said node to another said node.

Viewed from yet another vantage point a method for sending a message from one device to another without regard to protocol or cable media is disclosed, comprising in combination, associating the message with a target ID corresponding to a target device; mapping said ID to a transport instance; passing the message to a transport corresponding to said transport instance; receiving the message at a bridge node; and forwarding the message from the bridge node to the target device associated with said target ID.

Viewed from an additional vantage point a method for identifying devices without regard to protocol or cable media is disclosed, comprising in combination, associating a transport with a device at a bridge node; mapping said transport to an enumerated identification at said bridge node; making said bridge transports available to other devices connected to said bridge node.

These and other objects of the present invention will be made manifest when considering the following detailed specification when taken in conjunction with the appended drawing figures.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
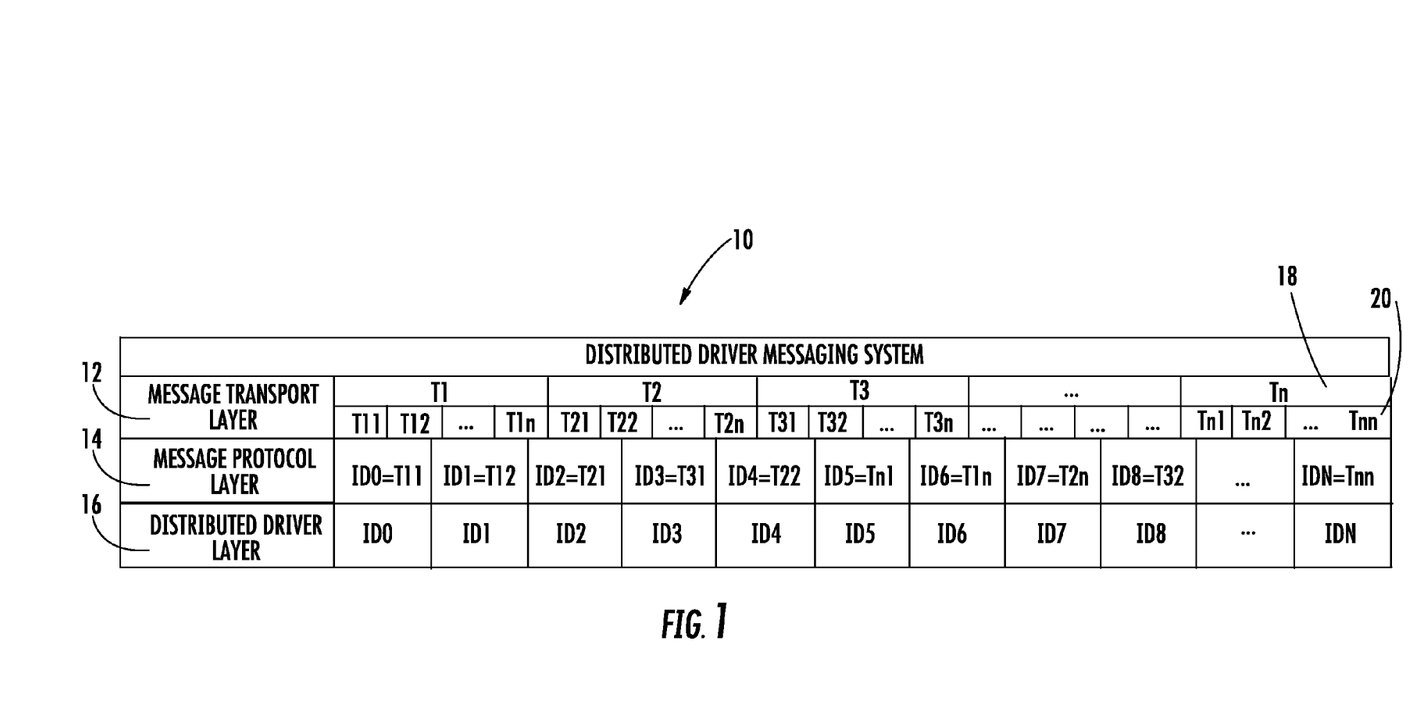
FIG. 1 is a schematic diagram of a distributed driver messaging system of the present invention.

Referring now to the drawing figures, FIG. 1 is directed to a distributed driver messaging system 10 according to the present invention. The distributed driver messaging system 10 includes three layers therewithin for establishing a message path as will be described in more detail hereinbelow. The three layers are the message transport layer 12, the message protocol layer 14, and the distributed driver layer 16.

The message transport layer 12 serves the purpose of maintaining a log of available transports (Tn) 18 and available instances (Tnn) 20 of those transports (Tn) 18. For instance, T1 may be a transport for a 1394 device, T2 may be a transport for an RS-232 device, and so on. Further, as there may be more than one 1394 device port active on a node, T11 may indicate a first instance of the 1394 devices, or a first port, while T12 would indicate a second instance of the 1394 devices, or second port. Likewise, T21 would indicate a first instance, or first port, of an RS-232 device, while T22 would indicate a second instance, or second RS-232 port. As may now be understood by those skilled in the art, additional transports T3-Tn may also be indicated, along with additional instances of those transports T31-Tnn.

Figure 2:
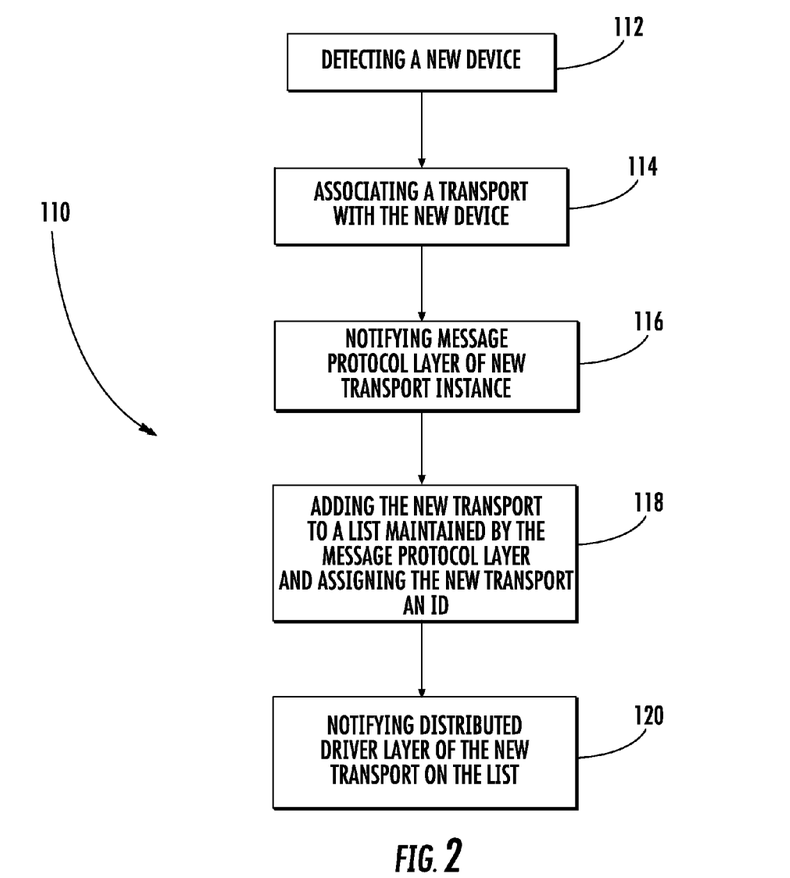
FIG. 2 is a flowchart of a method of assigning transports and identification codes with target devices of the present invention.

Referring now also to FIG. 2 and the distributed driver messaging system device establishment method 110 described therein, once the message transport layer 12 indicates a new device as in step 112, it passes that information to the message protocol layer 14. The message protocol layer 14 then indexes that instance with an appropriate identification. For instance, when the first transport T1 is indicated as in step 114 the first instance of that transport T11 is reported to the message protocol layer 14 by the message transport layer 12 as in step 116. The message protocol layer then assigns an identification to that transport for later reference, such as ID0 as in step 118.

As may be gleaned from FIG. 1 then, T12 was the next instance indicated in this exemplary distributed driver messaging system 10 and when the message transport layer 12 passed that information to the message protocol layer 14, the message protocol layer 14 assigned instance T12 the identification ID1. Thereafter, it may be surmised from the exemplary FIG. 1 that a new transport T2 was created and new instance T21 was passed by the message transport layer 12 to the message protocol layer 14 where ID2 was assigned. One can now easily follow the ID path to discern that transport Tn would be the last transport indicated and instance Tnn the last instance of transport Tn. Likewise, IDN is the identification assigned to transport instance Tnn.

Significantly, the message protocol layer 14, though now cognizant of certain transport instances by the provision of such information by the message transport layer 12, does not have any information regarding the actual transport other than that an instance exists of some transport. That is, the message protocol layer 14 only maintains information that some device, such as instance T11, is available to transport messages, but does not have any other information about the device.

Furthermore, once the message protocol layer 14 adds a new instance identification to its list, it passes that information on to the distributed driver layer 16 as in step 120. The distributed driver layer 16, then will maintain a list of device identifications as provided by the message protocol layer 14, but requires no other information. That is, when the message protocol layer 14 passes ID0 to the distributed driver layer 16, the distributed driver layer 16 logs device ID0 as available for message transfer in the future. However, the distributed driver layer 16 is, significantly, without any information regarding which transport Tn or which instance, or port, Tnn that it might in the future pass a message to when directed by an application to do so. All the distributed driver layer 16 will be able to assist with is identifying a device for targeting a message. It may, for example, make such availability and identification information available to a software application so that the application or a user of the application is aware of device availability.

Figure 3:
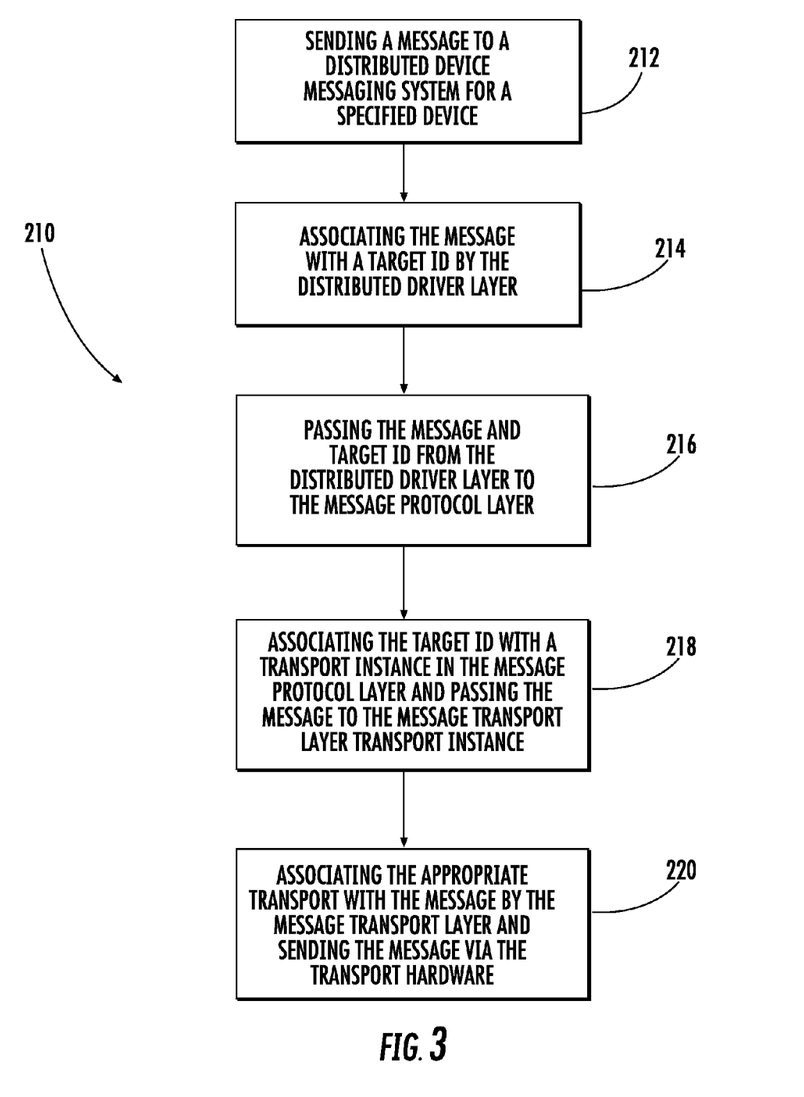
FIG. 3 is a flowchart of a method of sending a message to a device of the present invention.

Thereafter, and referring now also to FIG. 3 and the distributed driver message sending method 210 described therein, when an application (not shown) wants to send a message via a device as in step 212, the application passes the message for the desired device to the distributed driver layer 16 which, in turn, appends the appropriate ID to the message, as in step 214, and passes the message and ID to the message protocol layer, as in step 216, which, in turn, passes the message to the correlated transport instance, as in step 218, which, in turn, passes the message to the appropriate transport, as in step 220.

By way of example, an application may wish to send a message, or a string of code or characters, to the device connected to ID3. The application has no information regarding how the message will get to that device, what type of protocols that device may be capable of understanding, nor what type of connectivity is between it and the desired device, as it just wishes to send its message. It then sends its message to the distributed driver layer 16 for distribution to ID3 and the distributed driver layer 16 passes the message along with ID3 tagged thereon to the message protocol layer 14. The message protocol layer 14 looks up ID3 in its list and correlates it with transport instance T31 and passes the message to the message transport layer 12 for instance T31. The message transport layer 12 then sends the message via transport T3 to the device connected to the port associated with T31.

As indicated above, the transport means, or connectivity, may be of any of a variety of transport means. Transports preferred for this embodiment are 1394 and RS-232 type devices, but are preferred for their ready accessibility to high throughput applications and ready availability and not because of some limitation of the disclosed invention. Low throughput devices would work just as readily, but would probably not be indicated as useful. For example, one may wish to connect a video monitor having 1394 connectivity to a computer having RS-232 connectivity. The computer may communicate fine with TCP/IP but not FCP, while the video camera may communicate fine with FCP but not TCP/IP. Additionally, the connectivity means, cables do not match. With the present system, it does not matter; communication may be achieved via a bridge that includes a 1394 and RS-232 port along with the disclosed distributed device messaging system. That is, the invention is wholly independent of proprietary device protocols for purposes of sending messages and cabling limitations. It is reliant instead, on the use of appropriate transports.

Figure 4:
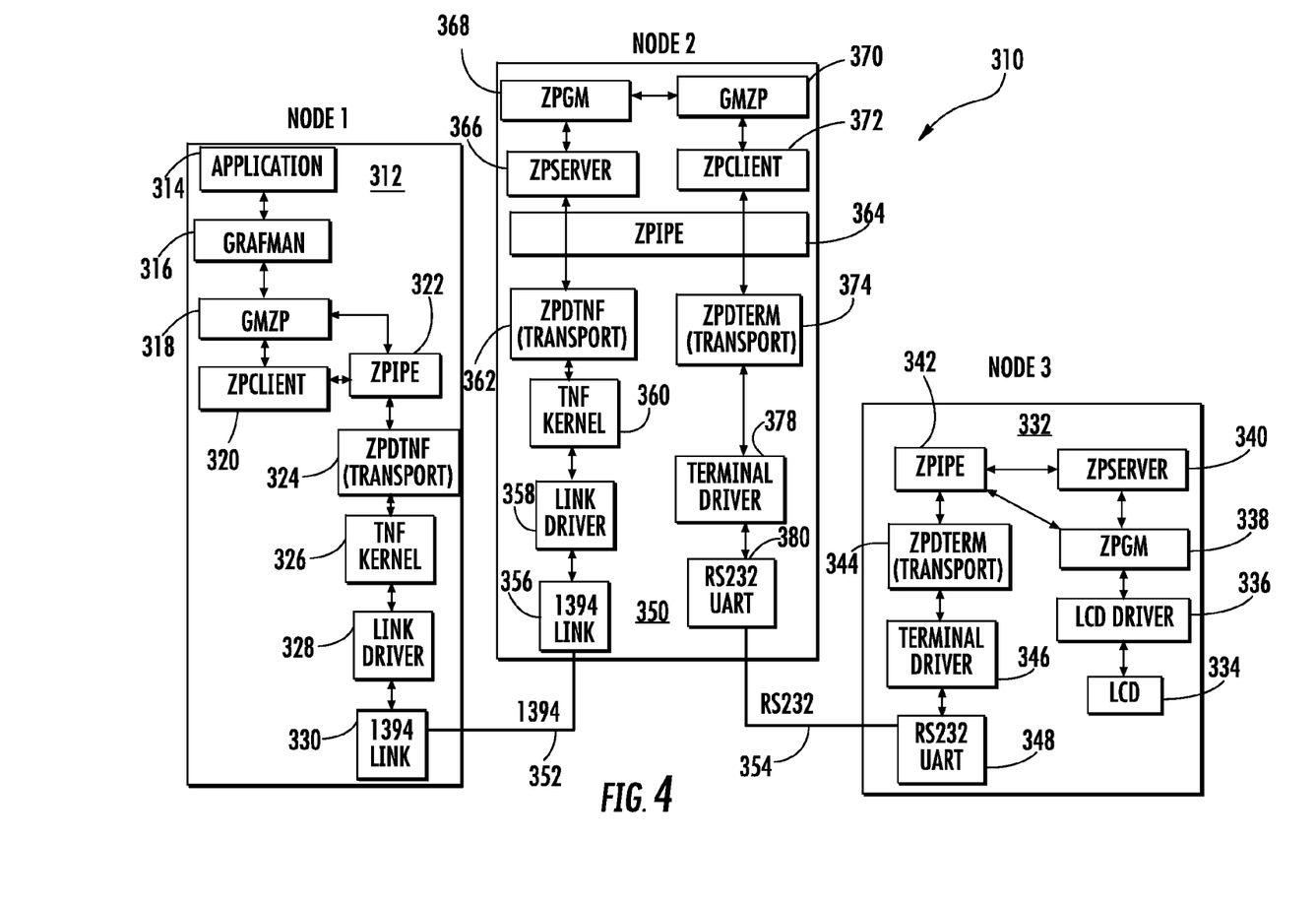
FIG. 4 is a schematic drawing of a first embodiment of the present invention.

Referring now to FIG. 4, a first embodiment of the present invention is depicted as 310. Application 310 includes, generally, a bridge 350 at node 2, operatively coupling a client application 314 at node 1, 312, for display on a node 3, 332, LCD display 334. Node 1 may be for example an input device, such as a computer without a monitor, and node 3 may be an LCD display device, such as a television monitor. The problem solved by this embodiment is that the device at node 1, without the aid of the bridge at node 2, could not communicate with the device at node 3. The inventive bridge at node 2 solves this problem by not only providing the appropriate physical connectivity, but also by providing the heterogeneous ZPipe distributed messaging service system as described above.

More particularly, node 1 includes an application 314; such as a graphical user interface (GUI) application. Node 1 also includes a graphics package, indicated as grafman 316, in operative communication with the GUI application 314, for converting graphics commands into rudimentary linedraw messages, for example. Likewise, GMZP 318 is a grafman ZPipe driver that transfers the application graphics messages to ZPipe 322. ZPClient enumerates ZPServers on remote nodes and communicates with those ZPServers to enumerate remote devices. For each remote device (e.g. LCD served by ZPGM), ZPClient instantiates a local ZPipe driver (e.g. GMZP). ZPipe 322 is positioned to transfer a message from the application, via a graphics package in this example, to the appropriate transport (as described above) since ZPipe includes the distributed driver messaging system. In this example, ZPipe 322 is in operative communication with a 1394 connection and therefore node 1 includes ZPDTNF 324, a 1394 transport, TNF kernel 326, a 1394 transaction layer, and link driver 328, a 1394 link driver, between ZPipe 322 and the 1394 link physical 330. Thereafter, a 1394 cable 352 is coupled to both the node 2 1394 link connection and the node 1 1394 link connection.

Similarly, node 3, 332, includes a LCD display 334 in operative communication with an appropriate LCD driver 336 for converting graphics messages, such as those sent by grafman 316, into pixel presentation on the LCD display. Thereafter a conduit or driver for receiving messages of the inventive system and converting them for graphical display is in operative communication with LCD driver 336 as ZPGM 338. ZPGM 338 is a ZPipe server driver for graphics devices. ZPServer 340 is the server component of ZPipe 342 which is, in turn, in operative communication with ZPGM 338. ZPServer 340 enumerates and maintains a list of available server drivers (e.g. ZPGM) and instances of devices accessible through the server drivers (e.g. LCD graphics driver) and broadcasts that list to connected nodes (for example at boot up). ZPGM 338 and ZPServer 340 both use ZPipe for delivery of messages. On the one hand, ZPServer 340 routes received messages from ZPipe to the appropriate server driver (e.g. ZPGM 338). On the other hand, if necessary, ZPGM sends reply messages via ZPipe back to message senders (e.g. application 314 at remote node 1, 312). Thereafter, an appropriate transport, ZPDTerm 344, along with Terminal driver 346, is in operative communication with ZPipe 342 and the RS232 DART serial bus physical connection 348.

Importantly, between nodes 1 and 3, lies node 2, the bridge 350 of this embodiment 310. Included in node 2 are a 1394 physical connection 356 and an RS-232 physical connection 380 corresponding to the 1394 physical connection 330 of node 1 and the RS-232 connection 348 of node 3. Connecting the 1394 links 330 and 356 is 1394 cable 352, and connecting the RS232 ports 380 and 348 is cable 354.

On the 1394 link side of node 2 is a link driver 358 in operative communication with 1394 link 356 and a TNF kernel 360. The TNF kernel 360 provides and acts within the transaction layer and provides bus management and 1394 enumeration services, as will be appreciated by those individuals having ordinary skill in the art having now the benefit of this disclosure. Thereafter, a 1394 transport, ZPDTNF 362, is in operative communication with the TNF Kernel 360 and the distributed driver messaging system ZPipe 364 (and particularly the message transport layer, 12, of ZPipe). ZPipe 364 is then in operative communication with the server side of the bridge 350 via ZPServer 366. ZPServer 366 then is in operative communication with ZPGM 368, a ZPipe server driver.

By next including a client-side ZPipe driver GMZP 370 in operative communication with ZPGM 368, a bridge is formed. Thereafter, the graphics driver GMZP 370 is in operative communication ZPClient 372, the compliment to ZPServer 366. ZPClient 372 is, likewise, in operative communication with ZPipe 364, and in particular, the distributed driver layer 16 of ZPipe 364. On the message transport layer side of ZPipe 364 is the necessary transport instance for RS-232, ZPDTerm 374. Thereafter, lies the necessary terminal driver 378 for the RS-232 physical device 380. As can now be appreciated by those of skill in the art informed by this disclosure, a bridge is formed on node 2. Some might view this bridge as virtual in that the client and server sides of the path do not interface directly with client applications or server devices per se, but instead, communicate only with a complimentary partnered pairing.

In use and operation, once all of the nodes are plugged in and turned on, booted up, a detection and creation phase will initiate. That is, the LCD display 334 at node 3 will be detected as an end physical device capable of receiving messages, or acting as a server. Creation starts from the physical device and works its way through the system. Hence, first, the LCD 334 is detected and a LCD driver 336 is built to support that LCD 334. Then, the ZPServer enumerator 340 detects the LCD graphics driver 336 and creates an instance of a graphics server ZPGM 338 to provide a server for the LCD graphics driver 336. ZPServer is part of ZPipe and is instantiated and loaded with ZPipe. It receives device messages (e.g. device added) from the driver architecture about the LCD and LCD driver. The ZPServer and ZPGM combination are created for each, local or remote, physical device detected (in this case for the LCD on node 3). Then the ZPClient enumerator 372 on node 2 will get notification of the ZPGM server 338 on node 3 and will create an instance of GMZP 370, the corollary client driver. Like ZPServer, ZPClient is a part of ZPipe, and, in this embodiment, is loaded and initialized at bootup. It could also be loaded dynamically as needed. Then, ZPServer 366 on node 2 will be notified of the creation of GMZP 370 on node 2 and ZPServer 366 will create a correlated instance of ZPGM 368. Similarly, the node 1 ZPClient enumerator 320 will be notified about ZPGM 368 and will create a GMZP client 318.

Significantly, as may be now appreciated from the previous description of FIGS. 1 through 3, the distributed driver messaging system at node 2 (ZPipe 364), has a message transport layer which has now recorded two transports (T1 and T2), ZPDTNF 362 and ZPDTerm 374, and one instance of each (T11 and T21). Likewise, the message protocol layer has associated each instance with an identification (T11=ID0 and T21=ID1). Further, the distributed driver layer has recorded the two identifications (ID0 and ID1). Similarly at node 1 and 3 similar indexing has been accomplished for the single transports included therewith. Therefore, now all is in place for transfer of commands from node 1 for presentation on node 3.

Thereafter, to display some application from node 1 on node 3, such may now be accomplished with the aid of the node 2 bridge as follows. The GUI application 314 at node 1 may now send a graphical message for receipt at node 3 via grafman software 316 which will assemble the GUI message into an appropriate message for presentation by a LCD display 334. The message is transferred to GMZP 318 for passage to ZPGM 368 via the pathway therebetween as directed by ZPipe 322 and ZPipe 364. Next, ZPGM 368 hands the message off to GMZP 370 which in turn passes the message on to ZPGM 338 by the pathway therebetween as directed by Zpipe 364 and ZPipe 342. Thereafter, ZPGM 338 presents the graphics message, stripped of routing information to the LCD driver 336 for presentation on the LCD display 334.

Figure 5:
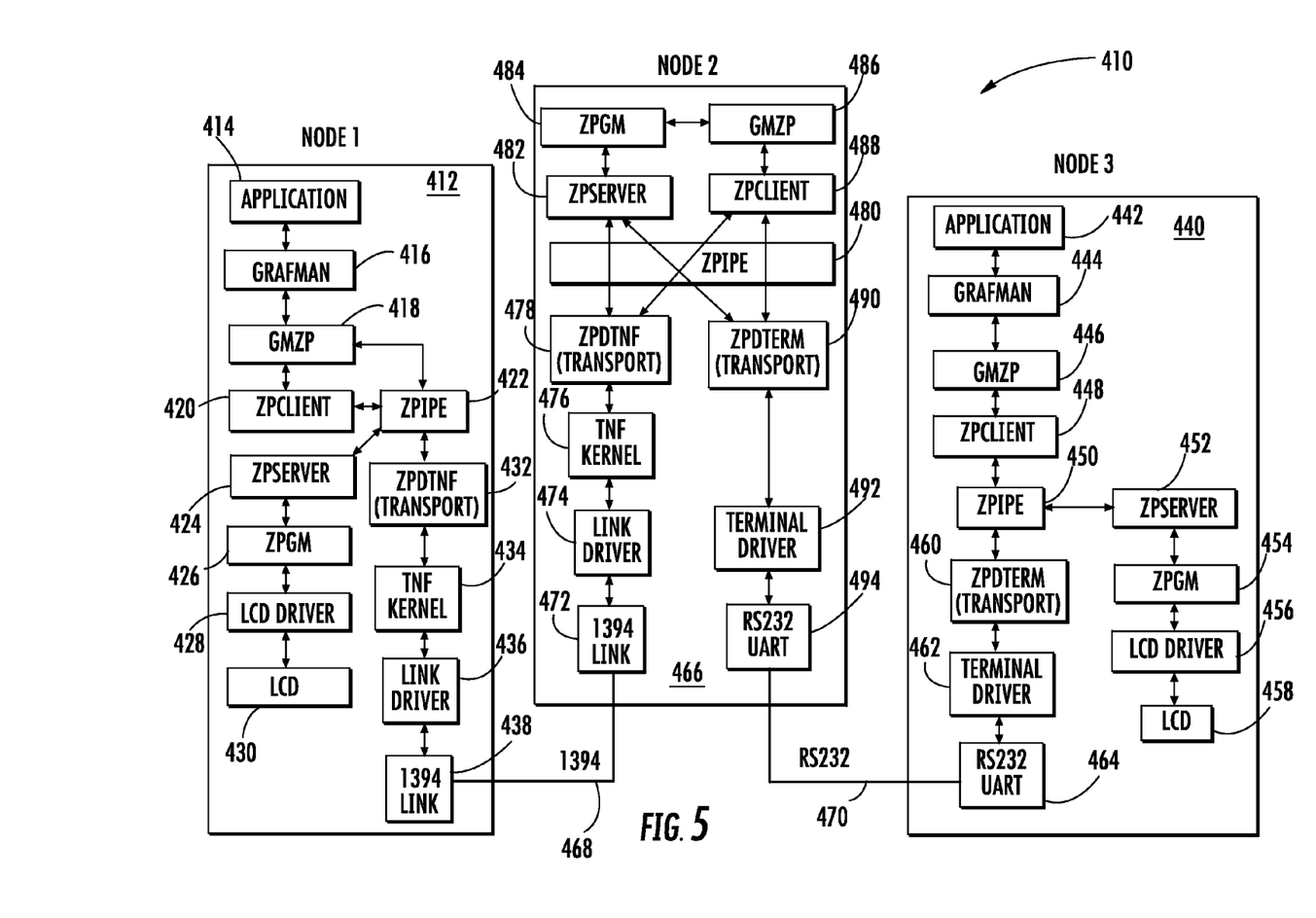
FIG. 5 is a schematic diagram of a second embodiment of the present invention.

Referring now to FIG. 5, as compared to FIG. 4, a bi-directional application/display system 410 is provided. That is, nodes 1 and 3 now both include client applications and server displays. Likewise, the bridge at node 2 is capable of transporting messages in both directions.

As can be seen when viewing node 1, 412, in addition to an application 414 (preferably GUI) and the attendant grafman 416, GMZP 418 and ZPClient 420 in operative communication with each other and ZPipe 422, also included in this embodiment 410 is an LCD display 430. As one skilled in the art should now informed by this disclosure be able to appreciate, an LCD driver 428, a graphics server driver ZPGM 426, and ZPServer 424 are in operative communication with each other and ZPipe 422 as well. Downstream from ZPipe 422, then, not unlike in FIG. 4, are an appropriate 1394 transport ZPDTNF 432, a TNF transaction layer element or kernel 434, a 1394 link driver 436, and a 1394 physical link 438.

Similarly, node 3, 440, as compared to embodiment 310 in FIG. 4, includes a client application as well as an LCD display. Just as in FIG. 4, included in node 3 are an LCD display 458, attendant LCD driver 456, graphics server driver ZPGM 454, and ZPServer 452, all in operative communication with one another and ZPipe 450. However, as indicated, node 3 also includes a client application 442 (preferably GUI), which is in operative communication with the appropriate grafman software 444, a client graphics driver GMZP 446, ZPClient 448, and ZPipe 450. Downstream of ZPipe 450, are the necessary RS-232 support elements, as the connectivity again displayed in this example is one of an RS-232 bus. That is, the RS-232 physical connection 464 is in operative communication with terminal driver 462, which, in turn, is on operative communication with an appropriate transport ZPDTerm 460.

Between nodes 1 and 3 lies the node 2 466 bridge. Cables 468 and 470 are coupled to connections 472 and 494 respectively. This node 2 is the same as the node 2 of FIG. 4 except that the plural transports (T1 and T2) may each be used for sending and receiving messages originated by either the application at node 3 or node 1. Included in node 2 are a 1394 physical connection 472 and an RS-232 physical connection 494 corresponding to the 1394 physical connection 438 of node 1 and the RS-232 connection 464 of node 3. Connecting the 1394 links 438 and 472 is 1394 cable 468, and connecting the RS232 ports 494 and 464 is cable 470.

On the 1394 link side of node 2 is a link driver 474 in operative communication with 1394 link 472 and TNF kernel 476. Thereafter, a 1394 transport, ZPDTNF 478, is in operative communication with the TNF Kernel 476 and the distributed driver messaging system ZPipe 480. ZPipe 480 is then in operative communication with the server side of the bridge via ZPServer 482 and the client side of the bridge via ZPClient 488. ZPServer 482 then is in operative communication with ZPGM 484, a ZPipe server driver and ZPClient 488 is in operative communication with GMZP 486, which is in turn in operative communication with ZPGM 484 completing the crisscrossing bridge.

ZPClient 488 is, likewise, in operative communication with ZPipe 480. On the message transport layer side of ZPipe 480 is the necessary transport instance for RS-232, namely, ZPDTerm 490. Thereafter lies the necessary terminal driver 492 for the RS-232 physical device 494.

As can now be appreciated, once the appropriate drivers have been instantiated as shown in FIG. 5, the application 414 at node 1 may be presented locally on LCD display 430, or remotely on LCD display 458, or on both simultaneously. Likewise, the application 442 at node 3 may be presented locally on LCD display 458, or remotely on LCD display 430, or on both simultaneously.

Figure 6:
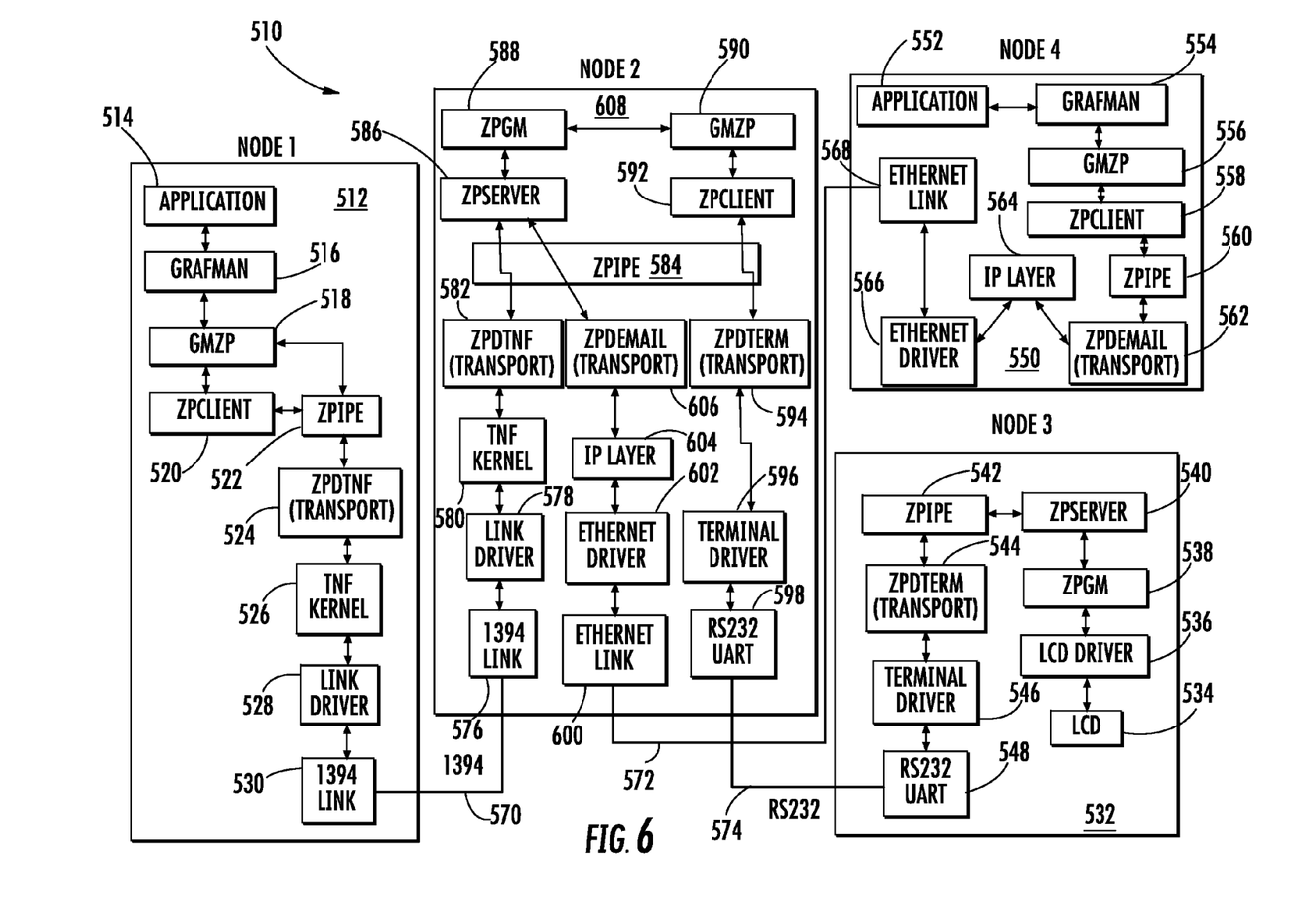
FIG. 6 is a schematic diagram of a third embodiment of the present invention.

A third exemplary embodiment 510 is presented in FIG. 6. In this embodiment 510, as compared again to FIG. 4, substantial similarity exists except a node 4, 550, has been added that includes an ethernet connection and which utilizes an email transport. Whereas in embodiment 310 of FIG. 4 the application of node 1 may be presented on the LCD display of node 3, in this embodiment 510 of FIG. 6 an application at node 4 may also be presented on the LCD display at node 3 wherein the graphics messages are sent from node 4 via an email transport via an ethernet link to node 2 which forwards messages via RS232 to node 3. The ethernet links of nodes 4 and 2 may be coupled by, for example, twisted pair ethernet cable, fiber, or the like and may be directly coupled, or coupled indirectly via a LAN, WAN, or the internet.

More particularly, node 1 includes an application 514; such as a graphical user interface (GUI) application. Node 1 also includes a graphics package, indicated as grafman 516, in operative communication with the GUI application 514, for converting graphics commands into rudimentary linedraw messages as indicated above. Likewise, GMZP 518 is a grafman ZPipe driver that may transfer application graphics messages to ZPipe 522. In this example, ZPipe 522 is in operative communication with both ZPClient 520 and a 1394 connection and therefore node 1 includes ZPDTNF 524, a 1394 transport, TNF kernel 526, a 1394 transaction layer, and link driver 528, a 1394 link driver, between ZPipe 522 and the 1394 link physical 530. Thereafter, a 1394 cable 570 is coupled to both the node 2 1394 link connection and the node 1 1394 link connection.

Similarly, node 3, 532, includes a LCD display 534 in operative communication with an appropriate LCD driver 536 for converting graphics messages, such as those sent by grafman 516 or 554, into pixel presentation on the LCD display. Thereafter a conduit or driver for receiving messages of the inventive system and converting them for graphical display is in operative communication with LCD driver 536 as ZPGM 538. ZPServer 540 is the server component of ZPipe 542 which is, in turn, in operative communication with ZPGM 538. Thereafter, an appropriate transport, ZPDTerm 544, along with Terminal driver 546, is in operative communication with ZPipe 542 and the RS232 UART serial bus physical connection 548.

Similarly, node 4, 550, includes a GUI application 552 which is in operative communication with grafman 554 and an instance of GMZP 556 along with ZPClient 558. ZPClient 558 is likewise in operative communication with ZPipe 560. In this example, the transport created is an email transport ZPDEmail 562 which is inoperative communication with ZPipe 560 and an Internet Protocol transaction layer 564. An ethernet physical link (such as a network interface card) 568 includes an ethernet driver 566 instantiated therewith and in operative communication with the IP transaction layer 564. Of course, ZPDEmail is only exemplary and other internet transports or network transports may be utilized in lieu of ZPDEmail.

Between nodes 1, 3, and 4 lies node 2, the bridge 608 of this embodiment 510. Included in node 2 are a 1394 physical connection 576, an RS-232 physical connection 598, and an ethernet physical connection 600 each of which corresponds respectively to to the 1394 physical connection 530 of node 1, the RS-232 connection 548 of node 3, and the ethernet connection 568 of node 4. Connecting the 1394 links 530 and 576 is 1394 cable 570, connecting the RS232 ports 598 and 548 is cable 574, and connecting the ethernet links 600 and 568 is ethernet media cable 572.

On the 1394 link side of node 2 is a link driver 578 in operative communication with 1394 link 576 and a TNF kernel 580. Thereafter, a 1394 transport, ZPDTNF 582, is in operative communication with the TNF Kernel 580 and the distributed driver messaging system ZPipe 584. ZPipe 584 is then in operative communication with the server side of the bridge 608 via ZPServer 586. ZPServer 586 then is in operative communication with ZPGM 588, a ZPipe graphics server driver.

Thereafter, as also with embodiment 310, a client-side ZPipe driver GMZP 590 is in operative communication with ZPGM 588. Thereafter, the graphics driver GMZP 590 is in operative communication ZPClient 592, the compliment to ZPServer 586. ZPClient 592 is, likewise, in operative communication with ZPipe 584. On the message transport layer side of ZPipe 584 is the necessary transport instance for RS-232, ZPDTerm 594. Thereafter, lies the necessary terminal driver 596 for the RS-232 physical device 598.

The etherlink portion of the bridge includes the enternet physical link 600 in operative communication with an ethernet driver 602 which is in turn in operative communication with an IP transaction layer 604. Thereafter, a ZPDEmail transport 606 is in operative communication with both the IP layer 604 and ZPipe 584. As the node 3 is the only server node, this path is in operative communication with ZPServer 586 so that the client node 4 may send messages via this bridge to the remote server node 3. Therefore, as can now be appreciated by those skilled in the art, both node 1 and node 4 may present applications on node 3 via the bridge at node 2.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for sending a message from a host device to a target device, wherein the host device is adapted to transmit messages that are compliant with a first transport protocol, and the target device is adapted to receive messages that are compliant with a second transport protocol, the method comprising in combination:

maintaining a list of available drivers and a list of devices accessible through drivers on the list of available drivers, the list of devices comprising at least one of said host device and said target device;

broadcasting the list of available drivers and the list of devices to connected devices comprising the host device and the target device;

formatting the message to be compliant with the first transport protocol;

associating the message with a target ID corresponding to the target device, at a bridge node;

mapping said target ID to a transport instance at the bridge node, wherein said mapping is based at least in part upon a list of target IDs maintained within a distributed driver layer of a distributed driver messaging system configured to control the target device;

passing the message using said first transport protocol corresponding to the transport instance;

receiving the message at the bridge node;

reformatting the message to be compliant with the second transport protocol;
forwarding the message from the bridge node to the target device associated with said target ID; and
causing the target device to execute the forwarded message compliant with the second transport protocol;
wherein said first and said second transport protocols differ from one another.

2. The method of claim 1 further comprising maintaining a list of transport protocols and transport instances in a message transport layer of said distributed driver messaging system.

3. The method of claim 2 further comprising maintaining said mapping list within a message protocol layer of said distributed driver messaging system.

4. A method for facilitating communications between nodes in a network, the method comprising:
assigning a unique identifier to one or more display devices directly or indirectly connected to a host node, wherein the host node comprises a device driver adapted to transmit a control message to said one or more display devices;
identifying a first plurality of transports connected to the host node, wherein each transport comprises a first transport protocol;
identifying a second plurality of transports connected to a target node, wherein each transport comprises a second transport protocol;
mapping each unique identifier to a corresponding transport;
reformatting a control message received according to the second transport protocol to be compliant with the first transport protocol; and
transmitting the reformatted control message to manipulate the one or more display devices according to the first transport protocol;
wherein each display device that is indirectly connected to the source node and that is adapted to receive messages from the source node via said second transport protocol is adapted to communicate with a bridge node via the second transport protocol; and
wherein said plurality of transports as well as each of said unique identifiers are stored locally on the bridge node, the bridge node enabling the transmission of control messages over the first transport protocol and the second transport protocol simultaneously; and
wherein said first and said second transport protocols differ.

5. The method of claim 4, further comprising creating a virtual device at the bridge node for each display device that is indirectly connected to the host node and that is adapted to receive messages from the host node via said second transport protocol.

6. The method of claim 5, wherein each of said virtual devices is adapted to appear to the host node as a controllable device.

7. A method for facilitating communications between nodes in a network, the method comprising:
assigning a unique identifier to each device of an enumeration of devices connected to a source node;
providing an enumeration of transports connected to the source node, wherein each transport comprises a first transport protocol;
mapping each unique identifier to a corresponding transport in a bridge node, wherein a mapped association is stored within a message protocol layer of a distributed driver messaging system;
converting one or more received control commands compliant with a second transport protocol for a respective device into one or more control commands compliant with the first transport protocol based at least in part on the mapped association; and
transporting the converted one or more received control commands over the first transport protocol and transporting the one or more received control commands over the second transport protocol simultaneously;
wherein the first and the second transport protocols differ.

8. The method of claim 7, wherein the source node comprises an application configured to transmit the one or more received control commands to one or more remote devices.

9. The method of claim 8, wherein the application comprises a device driver.

10. The method of claim 9, further comprising creating a virtual device at the bridge node for each device that is indirectly connected to the source node to receive the one or more received control commands via the first transport protocol, wherein each virtual device is further configured to appear to the source node as a controllable device.

11. The method of claim 10, wherein each virtual device is further configured to forward the one or more received control commands to the one or more remote devices.

12. A bridging apparatus configured for use between a source node and one or more display devices, the bridging apparatus configured to facilitate communications between nodes in a network, the apparatus comprising:
a processor; and
a non-transitory computer readable medium comprising one or more instructions which when executed by the processor, causes the bridging apparatus to:
generate an enumeration of the one or more display devices, the one or more display devices directly or indirectly connected to the source node via a second transport protocol;
assign a unique identifier to each display device of the enumeration;
generate an enumeration of transports connected to the source node, wherein each transport comprises a first transport protocol;
map each unique identifier to a corresponding transport; and
broadcast the enumeration of the one or more display devices to the nodes in the network, the nodes in the network comprising the source node;
wherein:
the first and the second transport protocols differ; and
the source node comprises an application configured to transmit a control message to the one or more display devices.

13. The apparatus of claim 12, wherein the source node comprises an application.

14. The apparatus of claim 13, wherein the application comprises a device driver.

15. The apparatus of claim 12, further comprising instructions which when executed by the processor, further causes the bridging apparatus to determine the appropriate second transport protocol for sending out a given control message for the display device, the appropriate second transport protocol being determined based at least in part upon the unique identifier assigned to the one or more display devices.

16. The apparatus of claim 12, further comprising instructions which when executed by the processor, further causes the bridging apparatus to detect the presence of new transports connected to the source node.

17. The apparatus of claim 12, wherein the network comprises a high-speed serial bus network.

18. A method for sending a message from a host device to a target device, the host device configured to transmit messages that are compliant with a first transport protocol, the target device configured to receive messages that are compliant with a second transport protocol, the method comprising:
- receiving a broadcast message comprising a list of available drivers and a list of devices accessible through the available drivers maintained within a distributed driver layer of a distributed driver messaging system, the list of devices accessible through the available drivers comprising a target ID corresponding to the target device;
- formatting the message to be compliant with the first transport protocol;
- associating the message with the target ID corresponding to the target device, the message formatted so as to be compliant with the first transport protocol;
- mapping the target ID to a transport instance, the mapping based at least in part upon the list of devices accessible through the available drivers configured to control the target device;
- passing the message using said first transport protocol corresponding to the transport instance;
- receiving and reformatting the message to be compliant with the second transport protocol;
- forwarding the message to the target device associated with the target ID; and
- causing the target device to execute the forwarded message compliant with the second transport protocol;
- wherein the first transport protocol comprises a different protocol than the second transport protocol.

\* \* \* \* \*